United States Patent
Kim et al.

(10) Patent No.: US 12,508,877 B2
(45) Date of Patent: Dec. 30, 2025

(54) HEAT PUMP SYSTEM FOR VEHICLE AND METHOD FOR CONTROLLING SAME

(71) Applicant: Hanon Systems, Daejeon (KR)

(72) Inventors: Hak Kyu Kim, Daejeon (KR); Bok Sun Kang, Daejeon (KR); Tae Wan Kim, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 140 days.

(21) Appl. No.: 18/283,056

(22) PCT Filed: Apr. 12, 2022

(86) PCT No.: PCT/KR2022/005238
§ 371 (c)(1),
(2) Date: Sep. 20, 2023

(87) PCT Pub. No.: WO2022/220525
PCT Pub. Date: Oct. 20, 2022

(65) Prior Publication Data
US 2024/0174053 A1 May 30, 2024

(30) Foreign Application Priority Data

Apr. 12, 2021 (KR) .................. 10-2021-0047127
Apr. 8, 2022 (KR) .................. 10-2022-0043871

(51) Int. Cl.
*B60H 1/32* (2006.01)
*B60H 1/00* (2006.01)

(52) U.S. Cl.
CPC ....... *B60H 1/3213* (2013.01); *B60H 1/00885* (2013.01); *B60H 1/00899* (2013.01)

(58) Field of Classification Search
CPC .............. B60H 1/3213; B60H 1/00885; B60H 1/00899; B60H 1/00278; B60H 1/3216; B60H 1/32284; B60H 1/00921
See application file for complete search history.

(56) References Cited

FOREIGN PATENT DOCUMENTS

| EP | 2727754 A1 | 5/2014 |
| JP | 2015223880 A | 12/2015 |

(Continued)

OTHER PUBLICATIONS

International Search Report issued in PCT/KR2022/005238 on Jul. 15, 2022.

*Primary Examiner* — Kun Kai Ma
(74) *Attorney, Agent, or Firm* — NORTON ROSE FULBRIGHT US LLP

(57) ABSTRACT

Heat pump system for a vehicle and method for controlling same, which can, during mode changing between air heating and conditioning, prevent noise and vibration due to a pressure difference between refrigerants and reduce delay time. Heat pump system comprises a compressor compressing and discharging refrigerant, an indoor heat exchanger in air conditioning case, causing the refrigerant discharge from the compressor to heat the air, a first expansion valve for selectively expanding the refrigerant passed through the indoor heat exchanger, an evaporator in air conditioning case, enabling refrigerant to exchange heat with air evaporating refrigerant, and a controller for controlling the opening degree of the first expansion valve during mode changing between air heating and conditioning, wherein the controller turns off the compressor and gradually opens the first expansion valve to increase the opening degree when the mode is changed from the heat pump mode to the air conditioning mode.

11 Claims, 6 Drawing Sheets

(56) References Cited

FOREIGN PATENT DOCUMENTS

| | | |
|---|---|---|
| JP | 2020097363 A | 6/2020 |
| KR | 20140114938 A | 9/2014 |
| KR | 20150041739 A | 4/2015 |
| WO | WO-2017146267 A1 * | 8/2017 ............... B60H 1/22 |

* cited by examiner

PRIOR ART

FIG. 3

| | Second expansion valve (112) | First expansion valve (104) | Second refrigerant control valve (107) | Third expansion valve (121) | First refrigerant control valve (117) |
|---|---|---|---|---|---|
| Heat pump mode | CLOSED | control | ACCU | OPEN | CLOSED |

| | Second expansion valve (112) | First expansion valve (104) | Second refrigerant control valve (107) | Third expansion valve (121) | First refrigerant control valve (117) |
|---|---|---|---|---|---|
| Heat pump mode + dehumidification mode | CLOSED | control | ACCU<->CLOSED | OPEN | OPEN |

| | Second expansion valve (112) | First expansion valve (104) | Second refrigerant control valve (107) | Third expansion valve (121) | First refrigerant control valve (117) |
|---|---|---|---|---|---|
| Air conditioning mode | OPEN | OPEN | COND | CLOSED | CLOSED |

HEAT PUMP SYSTEM FOR VEHICLE AND METHOD FOR CONTROLLING SAME

CROSS REFERENCE TO RELATED APPLICATIONS

This patent application is a national phase under 35 U.S.C. § 371 of International Patent Application No. PCT/KR2022/005238 filed Apr. 12, 2022, which claims the benefit of priority from Korean Patent Application Nos. 10-2021-0047127 filed Apr. 12, 2021, and 10-2022-0043871 filed Apr. 8, 2022, each of which is hereby incorporated herein by reference in its entirety for all purposes.

TECHNICAL FIELD

The present invention relates to a heat pump system for a vehicle and a method for controlling the same, and more particularly, to a heat pump system for a vehicle and a method for controlling the same, which perform control by delaying an operation switching of a valve for a predetermined time in response to a change in an air conditioning mode.

BACKGROUND ART

In general, an air conditioner for a vehicle includes a cooling system for cooling the interior of the vehicle, and a heating system for heating the interior of the vehicle. The cooling system, at an indoor heat exchanger side of a refrigerant cycle, converts the air passing the outside of an indoor heat exchanger into cold air by exchanging heat between the air and refrigerant flowing inside an evaporator. Moreover, the heating system, at a heater core side of a cooling water cycle, converts the air passing the outside of the heater core into warm air by exchanging heat between the air and cooling water flowing inside the heater core.

In the meantime, differently from the air conditioner for the vehicle, a heat pump system which is capable of selectively carrying out cooling and heating by changing a flow direction of refrigerant using one refrigerant cycle is disclosed. The heat pump system includes, for instance, two heat exchangers, namely, an indoor heat exchanger mounted inside an air conditioning case to exchange heat with air blown to the interior of the vehicle and an outdoor heat exchanger mounted outside the air conditioning case to exchange heat, and a direction-changing valve for changing a flow direction of refrigerant. The indoor heat exchanger serves as a heat exchanger for cooling when the heat pump system is operated in a cooling mode according to the flow direction of refrigerant by the direction-changing valve and also serves as a heat exchanger for heating when the heat pump system is operated in a heating mode.

Referring to FIG. 1, a conventional heat pump system for a vehicle comprises a compressor 30, an indoor heat exchanger 32, a first expansion valve 34, an outdoor heat exchanger 48, and an evaporator 60.

The compressor 30 sucks and compresses refrigerant, and then, discharges the refrigerant in a high-temperature and high-pressure gaseous state. The indoor heat exchanger 32 heat-exchanges the refrigerant discharged from the compressor 30 with the air passing through the compressor 30 to heat the air. The first expansion valve 34 expands the refrigerant which has passed through the indoor heat exchanger 32, and the outdoor heat exchanger 48 heat-exchanges the refrigerant which has passed through the first expansion valve 34 with the outdoor air. The evaporator 60 heat-exchanges the refrigerant with the air passing through the evaporator to cool the air.

The evaporator 60 and the indoor heat exchanger 32 are sequentially installed in an air flow direction inside an air conditioning case 10. Between the evaporator 60 and the indoor heat exchanger 32, a temperature door 12 is provided to control an air flow rate between a warm air passage and a cold air passage, thereby adjusting the air temperature. On one side of the air conditioning case 10, a blower 20 is provided to blow indoor air or outdoor air into an air passage of the air conditioning case 10.

Between the evaporator 60 and the compressor 30, an accumulator 62 is additionally provided to separate the refrigerant, which flows into the compressor 30, into gas and liquid phases. Furthermore, between the outdoor heat exchanger 48 and the evaporator 60, an internal heat exchanger 50 which heat-exchanges the refrigerant supplied to the evaporator 60 with the refrigerant returning to the compressor 30 can be additionally provided. Meanwhile, the refrigerant passing through the indoor heat exchanger 32 selectively flows to the first expansion valve 34 by a first bypass valve 36 installed in parallel to the first expansion valve 34.

In addition, upstream of the evaporator 60, a second expansion valve 56 which selectively expands the refrigerant supplied to the evaporator 60 is provided. Between the outdoor heat exchanger 48 and the second expansion valve 56, a second bypass valve 58 which is installed in parallel to the second expansion valve 56 and selectively connects an outlet of the outdoor heat exchanger 48 and an inlet of the accumulator 62 can be provided. In an air conditioning mode (cooling mode), the first bypass valve 36 and the second expansion valve 56 are opened, and the first expansion valve 34 and the second bypass valve 58 are closed. The temperature door 12 opens the cold air passage. The refrigerant discharged from the compressor 30 sequentially passes through the indoor heat exchanger 32, the first bypass valve 36, the outdoor heat exchanger 48, the second expansion valve 56, the evaporator 60, and the accumulator 62, and then, returns to the compressor 30.

In a heat pump mode (heating mode), the first bypass valve 36 and the second expansion valve 56 are closed, and the first expansion valve 34 and the second bypass valve 58 are opened. Additionally, the temperature door 12 opens the warm air passage. The refrigerant discharged from the compressor 30 sequentially passes through the indoor heat exchanger 32, the first expansion valve 34, the outdoor heat exchanger 48, the second bypass valve 58, and the accumulator 62, and then, returns to the compressor 30. In this case, the indoor heat exchanger 32 acts as a heater, and the outdoor heat exchanger 48 acts as an evaporator.

On the other hand, during dehumidification in the heat pump mode, the refrigerant is discharged from the compressor 30, passes through the indoor heat exchanger 32. Thereafter, a portion of the refrigerant passing through the first expansion valve 34 sequentially passes through the outdoor heat exchanger 48, the second bypass valve 58, and the accumulator 62, and then, returns to the compressor 30. Additionally, another portion of the refrigerant passing through the first expansion valve 34 flows to the evaporator 60 to dehumidify the interior of the vehicle. The conventional heat pump system for a vehicle has a problem in that noise and vibration occur when refrigerant of high pressure is discharged at low pressure by pressure difference of the refrigerant upon changing modes between the heat pump mode and the air conditioning mode.

To overcome the problem, Korean Patent Publication No. 10-2015-0041739 (Apr. 17, 2015) discloses a heat pump system for a vehicle, which controls to perform direction change after delaying the direction change of a direction changing valve for a predetermined period of time upon changing modes between the heat pump mode and the air conditioning mode. The conventional heat pump system for a vehicle has a new problem causing discomfort since cold air is discharged late if a passenger desires.

DISCLOSURE

Technical Problem

Accordingly, the present invention has been made in view of the above-mentioned problems occurring in the related art, and it is an object of the present invention to provide a heat pump system for a vehicle and a method for controlling the same, which can prevent noise and vibration by pressure difference of refrigerant and can effectively reduce delay time upon changing modes between a heat pump mode and an air conditioning mode.

Technical Solution

To accomplish the above-mentioned objects, according to the present invention, there is provided a heat pump system for a vehicle, which includes: a compressor compressing and discharging refrigerant; an indoor heat exchanger installed within an air conditioning case and exchanging heat between air and the refrigerant discharged from the compressor to radiate heat; a first expansion valve selectively expanding the refrigerant that has passed through the indoor heat exchanger; and an evaporator installed within the air conditioning case and evaporating the refrigerant by exchanging heat with the air, the system including: a control unit which adjusts the opening degree of the first expansion valve when a mode is switched between a heat pump mode and an air conditioning mode, wherein the control unit turns off the compressor when the heat pump mode is switched into the air conditioning mode, and gradually increase the opening degree of the first expansion valve.

The control unit opens the first expansion valve after delaying the opening degree of the first expansion valve for a predetermined period of time when switching from the heat pump mode to the air conditioning mode.

The heat pump system further includes a first pressure sensor and a second pressure sensor which respectively sense pressure at the downstream side and the upstream side of the compressor in a refrigerant flow direction, wherein the control unit calculates a target pressure difference (DPT) based on the sensed pressure values from the first and second pressure sensors, and opens the first expansion valve up to the calculated target pressure difference (DPT).

The control unit compares the difference of pressure values measured in real-time from the first and second pressure sensors to the target pressure difference (DPT), and, when switching from the heat pump mode to the air conditioning mode, delays for a predetermined period of time after the difference in pressure values from the first and second pressure sensors has reached or is below the target pressure difference (DPT), then opens the first expansion valve to perform the air conditioning mode.

In the air conditioning mode, the first expansion valve is opened to allow the refrigerant to pass through as it is, and in the heat pump mode, the first expansion valve is controlled by the control unit to expand the refrigerant.

The heat pump system for a vehicle further includes: a dehumidification line which branches from the downstream side of the first expansion valve to supply refrigerant to the evaporator; and a first refrigerant control valve which is installed in the dehumidification line, wherein the control unit immediately closes the first refrigerant control valve when switching from the heat pump and dehumidification mode to the air conditioning mode.

An outdoor heat exchanger and a second expansion valve sequentially installed in the refrigerant line between the first expansion valve and the evaporator. The heat pump system further includes a second refrigerant control valve which adjust the opening degree between a bypass line which branches between the first expansion valve and the outdoor heat exchanger and bypasses the outdoor heat exchanger and the evaporator, and the refrigerant line directing the outdoor heat exchanger.

The heat pump system further includes: a battery cooling line which branches from the refrigerant line between the outdoor heat exchanger and the second expansion valve to bypass the evaporator; a third expansion valve and a battery chiller which are sequentially installed in the battery cooling line; and an accumulator which is installed upstream of the compressor, wherein the first pressure sensor is located between the compressor and the indoor heat exchanger, and the second pressure sensor is located between the battery chiller and the accumulator.

In the heat pump mode, the control unit opens the third expansion valve and the second expansion valve to allow the compressor to suck refrigerant and oil.

In another aspect of the present invention, there is provided is a method for controlling a heat pump system for a vehicle, which includes: a compressor compressing and discharging refrigerant; an indoor heat exchanger installed within an air conditioning case and exchanging heat between air and the refrigerant discharged from the compressor to radiate heat; a first expansion valve selectively expanding the refrigerant that has passed through the indoor heat exchanger; and an evaporator installed within the air conditioning case and evaporating the refrigerant by exchanging heat with the air, wherein a control unit is provided to adjust the opening degree of the first expansion valve when a mode is switched between a heat pump mode and an air conditioning mode, and the control unit controls differently the control speed of the first expansion valve when the heat pump mode is switched into the air conditioning mode and the control speed of the first expansion valve when the air conditioning mode is switched into the heat pump mode.

When the heat pump mode is switched into the air conditioning mode, the control unit controls to gradually increase the opening degree of the first expansion valve, and when the air conditioning mode is switched into the heat pump mode, the control unit rapidly controls the opening degree after the first expansion valve maintains a stop condition for a predetermined period of time in an opened state.

In the method for controlling the heat pump system, a first pressure sensor and a second pressure sensor respectively sense pressure at the downstream side and the upstream side of the compressor in a refrigerant flow direction, and the control unit calculates a target pressure difference (DPT) from the sensed pressure values from the first and second pressure sensors and opens the first expansion valve up to the calculated target pressure difference (DPT).

The heat pump system further includes: a dehumidification line which branches from the downstream side of the first expansion valve to supply refrigerant to the evaporator;

and a first refrigerant control valve which is installed in the dehumidification line, wherein the control unit immediately closes the first refrigerant control valve when switching from the heat pump and dehumidification mode to the air conditioning mode.

Advantageous Effect

The heat pump system for a vehicle and the method for controlling the same according to the present invention can effectively prevent noise caused by refrigerant pressure difference and achieve pressure equilibrium in a relatively short period of time. Ultimately, the heat pump system for a vehicle and the method for controlling the same according to the present invention can effectively reduce the delay time required to achieve pressure equilibrium to relatively rapidly supply cold air if a passenger desires, and preventing noise by refrigerant pressure difference.

BRIEF DESCRIPTION OF THE DRAWINGS

FIG. 3 is a table illustrating an operational control depending on an air conditioning mode of a control unit according to an embodiment of the present invention.

MODE FOR INVENTION

Hereinafter, a technical configuration of the heat pump system for a vehicle and a control method therefor will be described in detail below with reference to the attached drawings.

Figure 1:
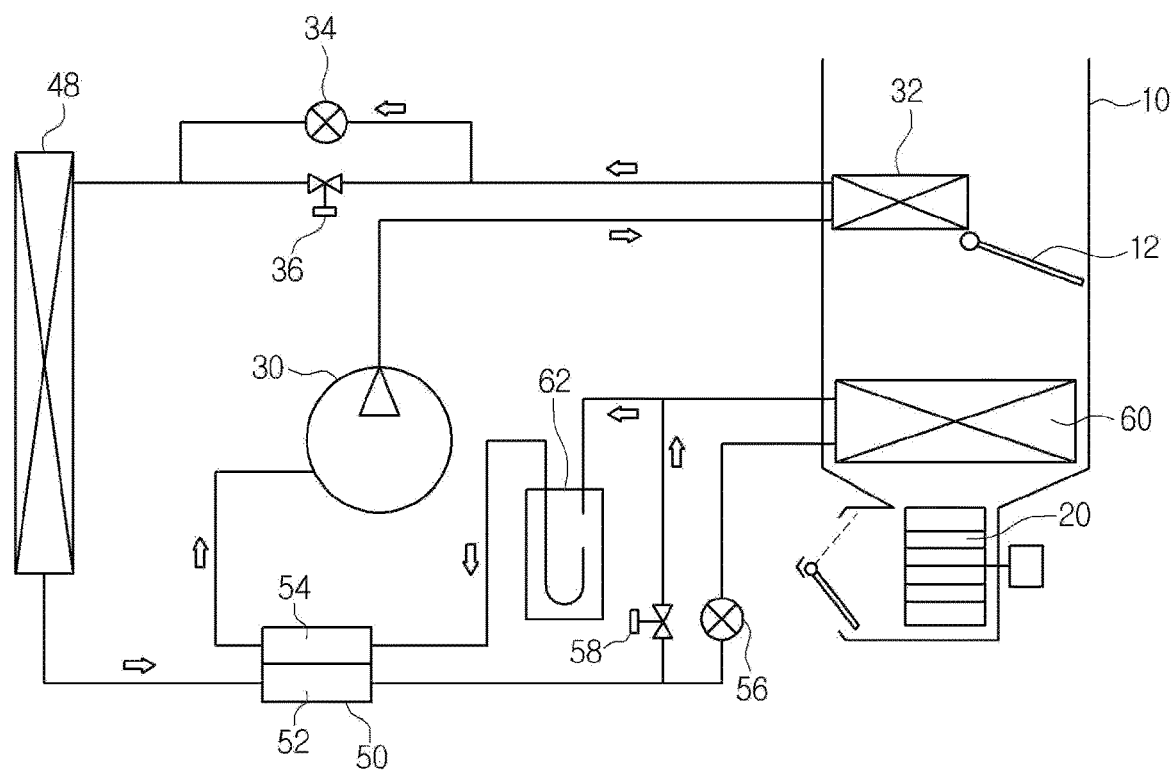
FIG. 1 illustrates a conventional heat pump system for a vehicle.
Figure 2:
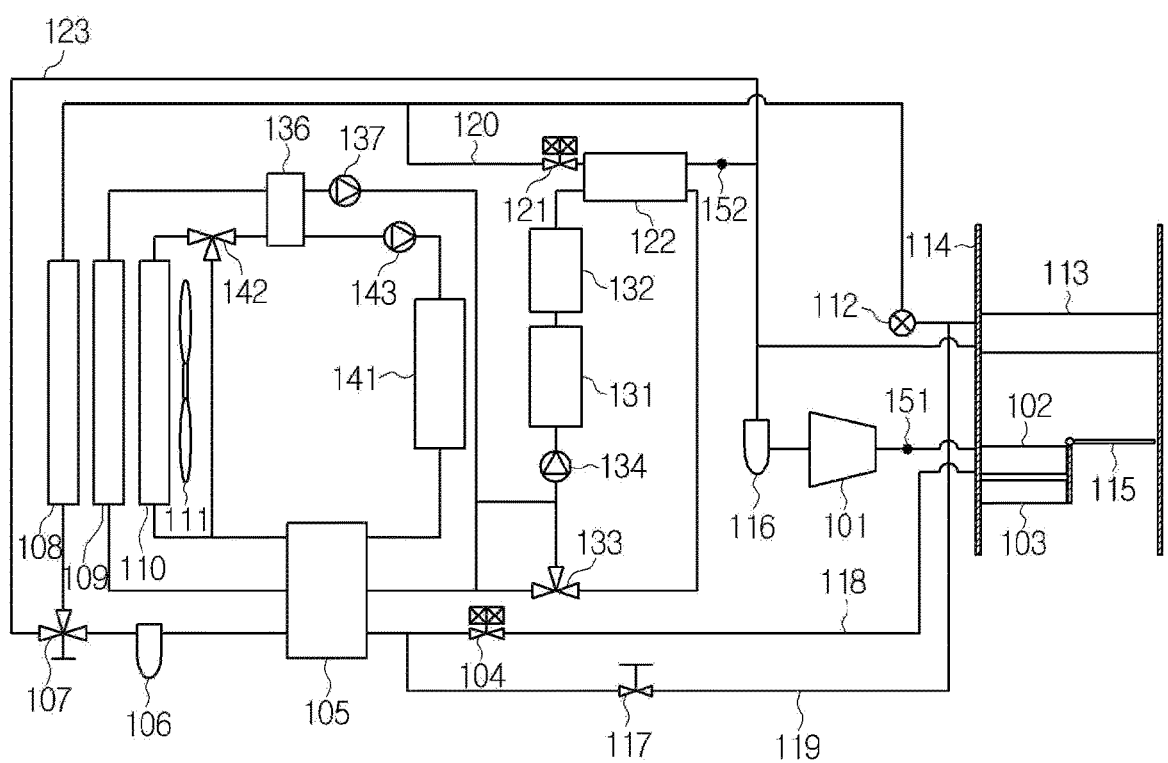
FIG. 2 illustrates a heat pump system for a vehicle according to an embodiment of the present invention.

Referring to FIGS. 2 and 3, a heat pump system for a vehicle according to an embodiment of the present invention comprises a compressor 101, an indoor heat exchanger 102, a first expansion valve 104, an outdoor heat exchanger 108, a second expansion valve 112, and an evaporator 113, which are sequentially arranged in a refrigerant line 118 in a refrigerant flow direction.

The compressor 101 sucks and compresses refrigerant, and then, discharges the refrigerant in a high-temperature and high-pressure gaseous state. The indoor heat exchanger 102 is provided inside an air conditioning case 114, and heat-exchanges the refrigerant discharged from the compressor 101 with the air passing through the indoor heat exchanger 102 to radiate heat. The first expansion valve 104 selectively expands the refrigerant that has passed through the indoor heat exchanger 102. The outdoor heat exchanger 108 heat-exchanges the refrigerant that has passed through the first expansion valve 104 with the outdoor air passing through the outdoor heat exchanger.

The outdoor heat exchanger 108 and the second expansion valve 112 are sequentially disposed in a refrigerant line 118 between the first expansion valve 104 and the evaporator 113. The second expansion valve 112 expands the refrigerant passing through the outdoor heat exchanger 108. The evaporator 113 is provided inside the air conditioning case 114, and heat-exchanges the refrigerant with the air passing through the evaporator 113 to evaporate the refrigerant. Furthermore, the evaporator 113 and the indoor heat exchanger 102 are sequentially installed inside the air conditioning case 114 in the air flow direction.

An electric heater 103 such as a PTC is additionally provided downstream of the indoor heat exchanger 102 within the air conditioning case 114 in the air flow direction. Additionally, a temperature door 115 that controls an air flow rate between a warm air passage and a cold air passage to adjust the temperature of the air discharged to the interior of the vehicle is provided between the evaporator 113 and the indoor heat exchanger 102. An accumulator 116 is provided upstream of the compressor 101. That is, the accumulator 116 is provided between the evaporator 113 and the compressor 101 to separate the refrigerant entering the compressor 101 into a gas phase and a liquid phase.

The heat pump system for a vehicle includes a refrigerant line 118, a dehumidification line 119, a bypass line 123, and a battery cooling line 120. The refrigerant line 118 circulates the refrigerant through the compressor 101, the indoor heat exchanger 102, the first expansion valve 104, the outdoor heat exchanger 108, the second expansion valve 112, and the evaporator 113. The dehumidification line 119 branches off downstream of the first expansion valve 104 and supplies the refrigerant to the evaporator 113.

A first refrigerant control valve 117 of a two-way valve type is provided on the dehumidification line 119 to control a flow of the refrigerant. The bypass line 123 branches between the first expansion valve 104 and the outdoor heat exchanger 108, and bypasses the outdoor heat exchanger 108 and the evaporator 113. At the branching point of the bypass line 123, a second refrigerant control valve 107 is provided.

The second refrigerant control valve 107 adjusts the opening degree between the bypass line 123 and the refrigerant line directing the outdoor heat exchanger 108. That is, the second refrigerant control valve 107 is formed in a three-way valve to control the refrigerant to flow to the outdoor heat exchanger 108 or to bypass the outdoor heat exchanger 108 to flow toward the bypass line 123. In addition, the refrigerant flowing through the bypass line 123 passes through the accumulator 116 and returns and circulates to the compressor 101.

More specifically, a water-cooled condenser 105 and a receiver drier 106 are sequentially provided in the refrigerant line 118 downstream of the first expansion valve 104. The water-cooled condenser 105 heat-exchanges the refrigerant of the refrigerant line 118 with cooling water for electronic parts, which will be described later, or cooling water for a battery. In this case, the dehumidification line 119 branches between the first expansion valve 104 and the water-cooled condenser 105. Moreover, the second refrigerant control valve 107 branches between the receiver drier 106 and the outdoor heat exchanger 108.

The battery cooling line 120 branches from the refrigerant line between the outdoor heat exchanger 108 and the second expansion valve 112, bypasses the second expansion valve 112 and the evaporator 113, and then, is connected to the compressor 101. A third expansion valve 121 and a battery chiller 122 are sequentially disposed in the battery cooling line 120 in the refrigerant flow direction. The third expansion valve 121 is an electronic expansion valve (EXV) to selectively expand the refrigerant. Moreover, the battery chiller 122 heat-exchanges the refrigerant with cooling water of the battery.

Meanwhile, the heat pump system for a vehicle includes an electronic part cooling water line and a battery cooling water line. An electronic part 141 is connected to the electronic part cooling water line, and the cooling water that has passed through the electronic part 141 exchanges heat with the refrigerant in the water-cooled condenser 105. The electronic part cooling water line passes through the first radiator 110, a reserve tank 136, a water pump 143, the electronic part 141, and the water-cooled condenser 105. A cooling water control valve 142 is provided in the electronic part cooling water line, so that the cooling water selectively passes through or bypasses the first radiator 110.

A battery 131 is connected to the battery cooling water line, and the cooling water that has passed through the battery 131 exchanges heat with the refrigerant in the water-cooled condenser 105 or exchanges heat with the refrigerant in the battery chiller 122. Additionally, the battery cooling water line passes through the second radiator 109, the reserve tank 136, a water pump 137, and the water-cooled condenser 105. Furthermore, the battery cooling water line passes through the battery 131, a water heater 132, a battery chiller 122, and a water pump 134.

Meanwhile, the battery cooling water line is equipped with a cooling water control valve 133 for controlling a cooling water flow. The outdoor heat exchanger 108, the second radiator 109, and the first radiator 110 heat-exchange the refrigerant or the cooling water with the outdoor air. The second radiator 109 is a low-temperature radiator on the battery side, and the first radiator 110 is a high-temperature radiator on the electronic part side. A blower fan 111 may be provided on one side of the outdoor heat exchanger 108, the second radiator 109, and the first radiator 110.

The heat pump system for a vehicle includes a control unit. The control unit adjusts the opening degree of the first expansion valve 104 upon changing a mode between the heat pump mode (heating mode) and the air conditioning mode (cooling mode). The first expansion valve 104 is an electronic expansion valve (EXV) to selectively expand the refrigerant. That is, in the air conditioning mode, the first expansion valve 104 is opened to allow the refrigerant to pass through as it is, and in the heat pump mode, the first expansion valve 104 is controlled by the control unit to expand the refrigerant.

If the heat pump mode is directly switched into the air conditioning mode, cold air that a passenger desires can be supplied in a short time. However, in this case, excessive noise by pressure difference of the refrigerant is generated such that the passenger may be surprised. In this case, since the vehicle recognizes it as an abnormal phenomenon, durability of each part of the system may be deteriorated. The control unit of the present invention can prevent noise due to pressure difference of the refrigerant by delaying and opening the opening degree of the first expansion valve 104 for a predetermined period of time when the heat pump mode is switched into the air conditioning mode.

In this case, the control unit delays and opens the opening degree of the first expansion valve 104 for a predetermined period of time when the heat pump mode is switched into the air conditioning mode, turns off the compressor, and gradually opens the first expansion valve 104. Through the above configuration, the noise due to the refrigerant pressure difference can be effectively prevented, and pressure equilibrium can be achieved in a relatively short period. As a result, the heat pump system can effectively reduce the delay time required to achieve pressure equilibrium to relatively rapidly supply cold air if a passenger desires, and preventing noise due to the refrigerant pressure difference.

More specifically, the heat pump system for a vehicle includes a first pressure sensor 151 and a second pressure sensor 152. The first pressure sensor 151 is installed on the downstream side of the compressor in a refrigerant flow direction, and the second pressure sensor 152 is installed on the upstream side of the compressor in the refrigerant flow direction. The first pressure sensor 151 senses pressure and temperature of the high-pressure side of the compressor 101, and the second pressure sensor 152 senses pressure and temperature of the low-pressure side of the compressor 101.

The control unit calculates a target pressure difference (DPT) from pressure values sensed by the first pressure sensor 151 and the second pressure sensor 152, and opens the first expansion valve 104 up to the calculated target pressure difference (DPT). When the heat pump mode is switched into the air conditioning mode, the compressor 101 is immediately turned off. The first expansion valve 104 moves to a predetermined position and operates the air conditioning mode after a predetermined period has elapsed once the difference in pressure values between the first pressure sensor 151 and the second pressure sensor 152 reaches the target pressure difference (DPT).

In other words, the control unit compares a difference of the real-time measured pressure values of the first pressure sensor 151 and the second pressure sensor 152 with the target pressure difference (DPT). Moreover, when the heat pump mode is switched into the air conditioning mode, the control unit delays for a predetermined period of time after the difference in pressure values between the first pressure sensor 151 and the second pressure sensor 152 falls to below the target pressure difference (DPT), and opens the first expansion valve 104 to perform the air conditioning mode.

The first pressure sensor 151 is located between the compressor 101 and the indoor heat exchanger 102, and the second pressure sensor 152 is located between the battery chiller 122 and the accumulator 116. To make the difference in pressure values between the first pressure sensor 151 and the second pressure sensor 152 reach the target pressure difference (DPT), the first expansion valve 104 is opened. Moreover, once the difference in pressure values between the first pressure sensor 151 and the second pressure sensor 152 reached the target pressure difference (DPT), the first expansion valve moves to the position of an air conditioner operating valve after a delay for a predetermined period of time.

In this case, the control unit immediately closes the first refrigerant control valve 117 when the heat pump and dehumidification mode is switched into the air conditioning mode. In the heat pump and dehumidification mode, the first refrigerant control valve 117 is opened, such that a portion of the refrigerant passing through the first expansion valve 104 returns to the compressor 101 through the evaporator 113 to circulate. When the heat pump and dehumidification mode is switched into the air conditioning mode, the control unit immediately closes the first refrigerant control valve 117, thereby preventing refrigerant noise due to the position change of the first expansion valve 104.

That is, the first expansion valve 104 expands the refrigerant through control of the opening degree in the heat pump mode, and then, when the heat pump mode is switched into the air conditioning mode, opens the valve passage so that the refrigerant can pass as it is without being expanded. In this case, conventionally, the compressor is turned off (OFF), and after a predetermined period of time (about 30 seconds), the first expansion valve 104 is opened to perform control to turn on (ON) the compressor.

In the present invention, when the heat pump mode is switched into the air conditioner mode, the compressor 101 is turned off (OFF), and the first expansion valve 104 is gradually opened immediately to reduce the pressure difference between the high-pressure side and the low-pressure side to below the target pressure difference, and then is fully opened (Open) to turn on (ON) the compressor 101. Therefore, the heat pump system according to the present invention can reduce the time taken to turn on (ON) the compressor compared to the conventional art. That is, to gradually open the first expansion valve 104 is distinguished from the conventional art to open valves at once after a predetermined period of time, that is, means that opening of the valve is performed in stages to reduce the pressure difference between the high-pressure side and the low-pressure side to below the target pressure difference, and then, the valves are fully opened. Furthermore, delaying the opening degree of the first expansion valve 104 for a predetermined period of time means that it takes more than the predetermined period of time to change the opening degree because the first expansion valve 104 is gradually opened.

In addition, in heat pump mode, the third expansion valve (121) and the second expansion valve 112 can be controlled to be opened so that the compressor 101 can suck refrigerant and oil. That is, although the second expansion valve 112 is closed (Closed) in heat pump mode, when the second expansion valve 112 is opened so that the compressor 101 can suck refrigerant and oil, the refrigerant and oil remaining in a pipe can be induced into the compressor 101.

Meanwhile, the control method of the heat pump system for a vehicle according to an embodiment of the present invention, a control unit delays and opens the opening degree of the first expansion valve 104 for a predetermined period of time when the heat pump mode is switched into the air conditioning mode, but the opening degree of the first expansion valve 104 is gradually increased. In addition, the control unit calculates the target pressure difference (DPT) from the pressure values sensed by the first pressure sensor 151 and the second pressure sensor 152, and opens the first expansion valve 104 up to the calculated target pressure difference (DPT).

Figure 4:
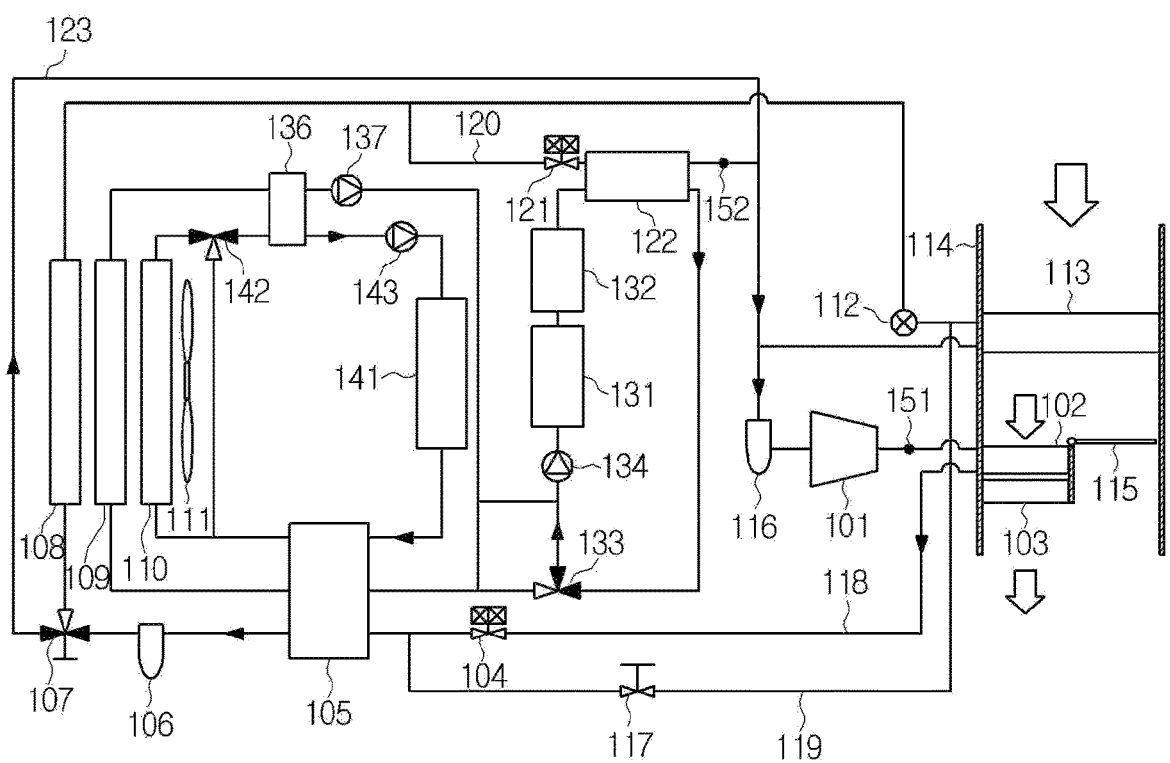
FIG. 4 illustrates a heat pump mode of the heat pump system for a vehicle according to an embodiment of the present invention.

Referring to FIG. 4, in the heat pump mode (heating mode), the refrigerant discharged from the compressor 101 flows through the indoor heat exchanger 102, and exchanges heat with the air passing through the indoor heat exchanger 102. The temperature door 115 opens the warm air passage, and the air is heated by the indoor heat exchanger 102 and is discharged into the interior of the vehicle. The refrigerant that has passed through the indoor heat exchanger 102 is throttled and expanded by the first expansion valve 104.

The refrigerant passing through the first expansion valve 104 flows to the bypass line 123 through the second refrigerant control valve 107, passes through the accumulator 116, and returns to the compressor 101 to circulate. In this case, the second expansion valve 112 is closed, the third expansion valve 121 is open, and the first refrigerant control valve 117 is closed. Meanwhile, the refrigerant passing the first expansion valve 104 exchanges heat with cooling water in the water-cooled condenser 105 to recover waste heat, and the refrigerant does not circulate through the second expansion valve 112 and the evaporator 113.

Figure 5:
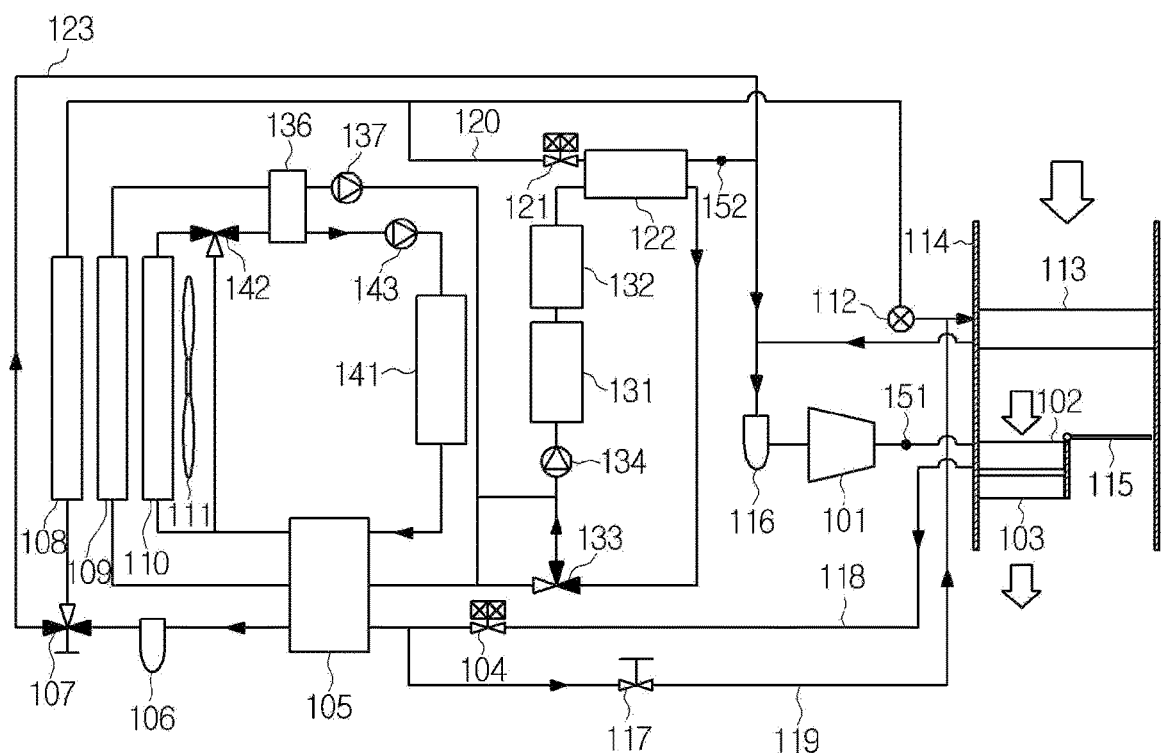
FIG. 5 illustrates a heat pump and dehumidification mode of the heat pump system for a vehicle according to an embodiment of the present invention.

Referencing to FIG. 5, in the heat pump and dehumidification mode (heating mode+dehumidification mode), the refrigerant discharged from the compressor 101 flows through the indoor heat exchanger 102, and exchanges heat with the air passing through the indoor heat exchanger 102. The temperature door 115 opens the warm air passage, and the air is heated by the indoor heat exchanger 102 and discharged to the interior of the vehicle. The refrigerant that has passed through the indoor heat exchanger 102 is throttled and expanded by the first expansion valve 104. A portion of the refrigerant passing through the first expansion valve 104 flows to the bypass line 123 by the second refrigerant control valve 107, passes through the accumulator 116, and then, returns to the compressor 101 to circulate. In this case, the second expansion valve 112 is closed, the third expansion valve 121 is opened, and the first refrigerant control valve 117 is opened. In addition, the refrigerant passing the first expansion valve 104 exchanges heat with cooling water in the water-cooled condenser 105 to recover waste heat, and the refrigerant does not circulate through the second expansion valve 112 and the evaporator 113.

Meanwhile, another portion of the refrigerant passing through the first expansion valve 104 flows to the dehumidification line 119 due to the opening of the first refrigerant control valve 117 and passes through the evaporator 113. The refrigerant flowing through the evaporator 113 exchanges heat with the air passing through the evaporator 113, and dehumidifies the air discharged into the vehicle interior. In this case, the second refrigerant control valve 107 may be partially closed to increase the refrigerant amount flowing to the dehumidification line 119.

Figure 6:
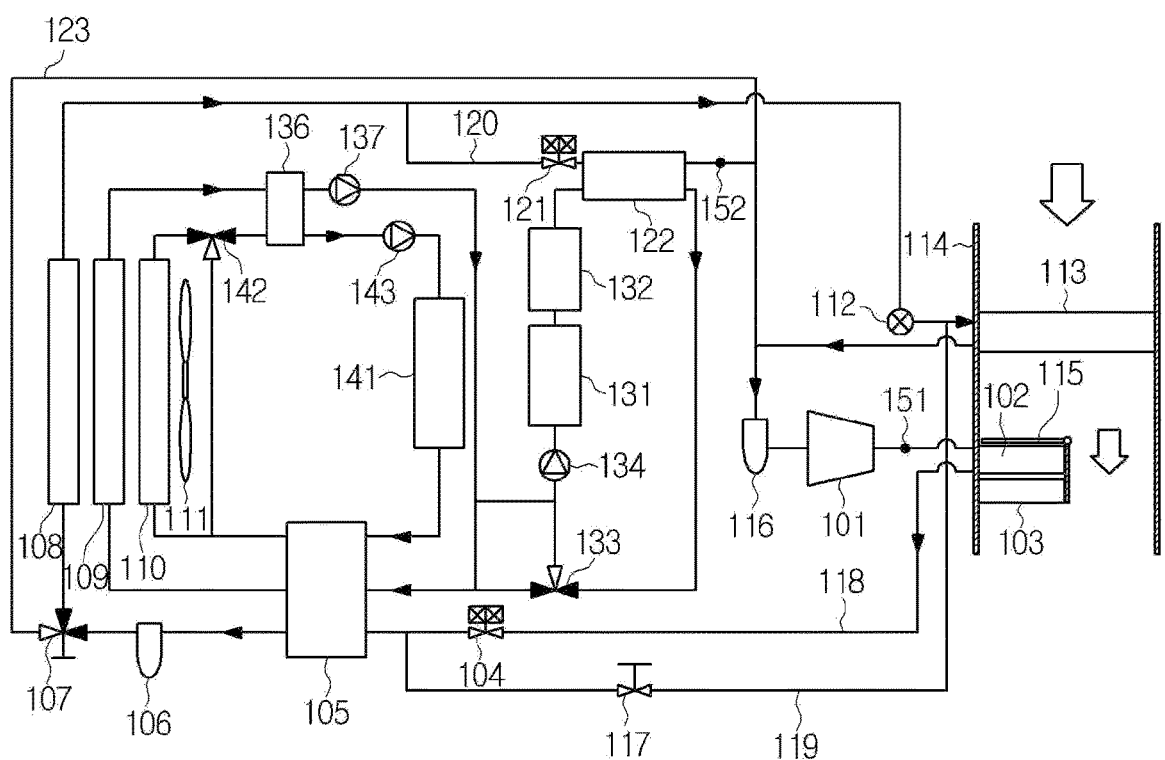
FIG. 6 illustrates an air conditioning mode of the heat pump system for a vehicle according to an embodiment of the present invention.

Referring to FIG. 6, in the air conditioner mode (cooling mode), the refrigerant discharged from the compressor 101 does not exchange heat with the air and directly passes through the indoor heat exchanger 102 flowing toward the first expansion valve 104. The temperature door 115 closes the warm air passage, and the cooled air passing through the evaporator 113 bypasses the indoor heat exchanger 102, and is discharged to the interior of the vehicle through the cold air passage.

The first expansion valve 104 is opened to pass the refrigerant as it is without expansion. At this time, the control unit compares the difference in pressure values detected by the first pressure sensor 151 and the second pressure sensor 152 with the target pressure difference (DPT). That is, the control unit opens the first expansion valve 104 after a predetermined time delay, Namely, the control unit gradually increases the opening degree of the first expansion valve 104 until the difference in pressure values between the first pressure sensor 151 and the second pressure sensor 152 falls below the target pressure difference (DPT).

The refrigerant passing through the first expansion valve 104 flows to the outdoor heat exchanger 108 by the second refrigerant control valve 107, heat exchange with the outdoor air, and then is throttled and expanded in the second expansion valve 112, and is evaporated by heat-exchange with the air passing through the evaporator 113, and then returns to the compressor 101 to circulate. In this case, the third expansion valve 121 is closed, and the first refrigerant control valve 117 is also closed. The control unit immediately closes the first refrigerant control valve 117 without delay to prevent refrigerant noise caused by the movement of the first expansion valve 104.

Meanwhile, the control unit controls differently the control speed of the first expansion valve 104 when the heat pump mode is switched into the air conditioning mode and the control speed of the first expansion valve 104 when the air conditioning mode is switched into the heat pump mode. That is, when the heat pump mode is switched into the air conditioning mode, the control unit controls to gradually increase the opening degree of the first expansion valve 104. When the air conditioning mode is switched into the heat pump mode, the control unit rapidly controls the opening degree after the first expansion valve 104 maintains a stop condition for a predetermined period of time (for about 30 seconds) in an opened state.

The heat pump system for a vehicle and the method for controlling the same are described with reference to the attached drawings, but these are merely exemplary. Those skilled in the art will understand that various modifications and equivalents can be derived therefrom. Therefore, the true technical scope should be determined by the technical ideas set forth in the attached claims.

What is claimed is:

1. A heat pump system for a vehicle, which includes: a compressor compressing and discharging refrigerant; an indoor heat exchanger installed within an air conditioning case and exchanging heat between air and the refrigerant discharged from the compressor to radiate heat; a first expansion valve selectively expanding the refrigerant that has passed through the indoor heat exchanger; and an evaporator installed within the air conditioning case and evaporating the refrigerant by exchanging heat with the air, the system comprising:
    a control unit which adjusts the opening degree of the first expansion valve when a mode is switched between a heat pump mode and an air conditioning mode; and
    a first pressure sensor and a second pressure sensor which respectively sense pressure at the downstream side and the upstream side of the compressor in a refrigerant flow direction,
    wherein the control unit turns off the compressor when the heat pump mode is switched into the air conditioning mode, and gradually increase the opening degree of the first expansion valve, and
    wherein the control unit calculates a target pressure difference (DPT) based on the sensed pressure values from the first and second pressure sensors, and opens the first expansion valve up to the calculated target pressure difference (DPT).

2. The heat pump system for a vehicle according to claim 1, wherein the control unit opens the first expansion valve after delaying the opening degree of the first expansion valve for a predetermined period of time when switching from the heat pump mode to the air conditioning mode.

3. The heat pump system for a vehicle according to claim 1, wherein the control unit compares the difference of pressure values measured in real-time from the first and second pressure sensors to the target pressure difference (DPT), and, when switching from the heat pump mode to the air conditioning mode, delays for a predetermined period of time after the difference in pressure values from the first and second pressure sensors has reached or is below the target pressure difference (DPT), then opens the first expansion valve to perform the air conditioning mode.

4. The heat pump system for a vehicle according to claim 1, wherein in the air conditioning mode, the first expansion valve is opened to allow the refrigerant to pass through as it is, and in the heat pump mode, the first expansion valve is controlled by the control unit to expand the refrigerant.

5. The heat pump system for a vehicle according to claim 1, wherein an outdoor heat exchanger and a second expansion valve sequentially installed in the refrigerant line between the first expansion valve and the evaporator, and further comprising: a second refrigerant control valve which adjust the opening degree between a bypass line which branches between the first expansion valve and the outdoor heat exchanger and bypasses the outdoor heat exchanger and the evaporator, and the refrigerant line directing the outdoor heat exchanger.

6. The heat pump system for a vehicle according to claim 5, further comprising:
    a battery cooling line which branches from the refrigerant line between the outdoor heat exchanger and the second expansion valve to bypass the evaporator;
    a third expansion valve and a battery chiller which are sequentially installed in the battery cooling line; and
    an accumulator which is installed upstream of the compressor,
    wherein the first pressure sensor is located between the compressor and the indoor heat exchanger, and the second pressure sensor is located between the battery chiller and the accumulator.

7. The heat pump system for a vehicle according to claim 6, wherein in the heat pump mode, the control unit opens the third expansion valve and the second expansion valve to allow the compressor to suck refrigerant and oil.

8. A heat pump system for a vehicle, which includes: a compressor compressing and discharging refrigerant; an indoor heat exchanger installed within an air conditioning case and exchanging heat between air and the refrigerant discharged from the compressor to radiate heat; a first expansion valve selectively expanding the refrigerant that has passed through the indoor heat exchanger; and an evaporator installed within the air conditioning case and evaporating the refrigerant by exchanging heat with the air, the system comprising:
    a control unit which adjusts the opening degree of the first expansion valve when a mode is switched between a heat pump mode and an air conditioning mode,
    wherein the control unit turns off the compressor when the heat pump mode is switched into the air conditioning mode, and gradually increase the opening degree of the first expansion valve,
    a dehumidification line which branches from the downstream side of the first expansion valve to supply refrigerant to the evaporator; and
    a first refrigerant control valve which is installed in the dehumidification line, wherein the control unit immediately closes the first refrigerant control valve when switching from the heat pump and dehumidification mode to the air conditioning mode.

9. A method for controlling a heat pump system for a vehicle, which includes:
    a compressor compressing and discharging refrigerant; an indoor heat exchanger installed within an air conditioning case and exchanging heat between air and the refrigerant discharged from the compressor to radiate heat; a first expansion valve selectively expanding the refrigerant that has passed through the indoor heat exchanger; and an evaporator installed within the air conditioning case and evaporating the refrigerant by exchanging heat with the air,
    wherein a control unit is provided to adjust the opening degree of the first expansion valve in response to a mode being switched between a heat pump mode and an air conditioning mode, and
    wherein the control unit controls differently the control speed of the first expansion valve in response to the heat pump mode being switched into the air conditioning mode and the opening degree control speed of the first expansion valve in response to the air conditioning mode being switched into the heat pump mode, wherein the heat pump system further comprises a first pressure sensor and a second pressure sensor which respectively sense pressure at the downstream side and the upstream side of the compressor in a refrigerant flow direction, and wherein the control unit calculates a target pressure difference (DPT) from the sensed pressure values from the first and second pressure sensors and opens the first expansion valve up to the calculated target pressure difference (DPT).

10. The method according to claim 9, wherein when the heat pump mode is switched into the air conditioning mode, the control unit controls to gradually increase the opening degree of the first expansion valve, and when the air conditioning mode is switched into the heat pump mode, the control unit rapidly controls the opening degree after the first expansion valve maintains a stop condition for a predetermined period of time in an opened state.

11. The method according to claim 9, wherein the heat pump system further comprises:

a dehumidification line which branches from the downstream side of the first expansion valve to supply refrigerant to the evaporator; and a first refrigerant control valve which is installed in the dehumidification line, and wherein the control unit immediately closes the first refrigerant control valve when switching from the heat pump and dehumidification mode to the air conditioning mode.

* * * * *